Sept. 21, 1943.    R. M. HEINTZ    2,330,121
MOTOR COOLING SYSTEM
Filed Oct. 4, 1940
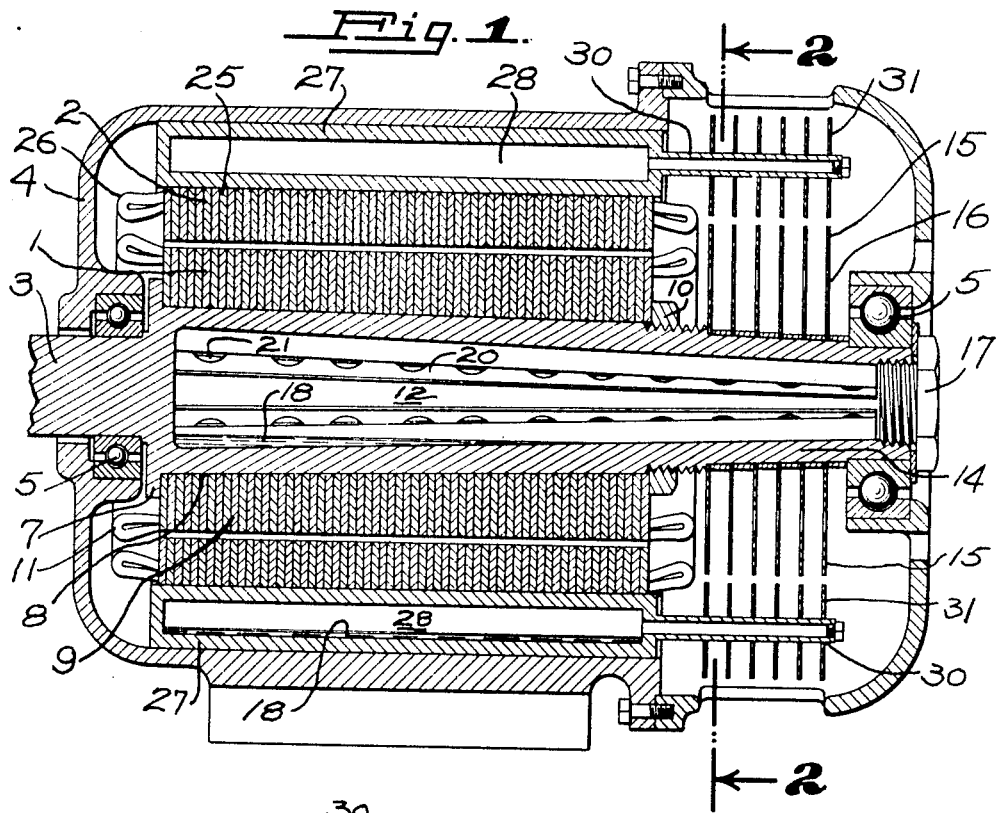
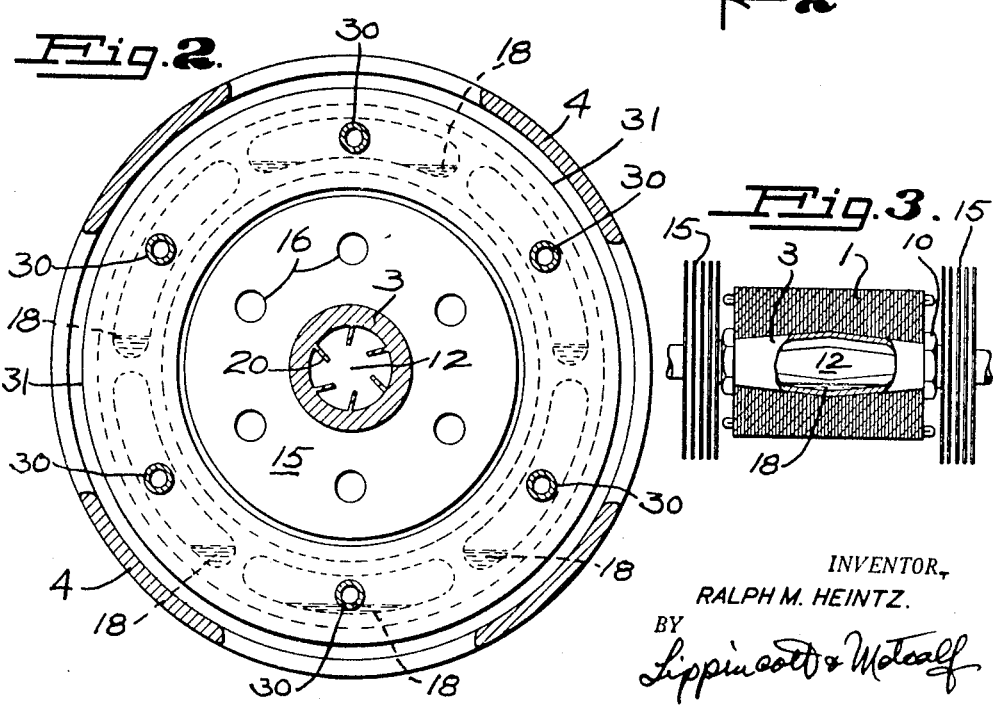
INVENTOR,
RALPH M. HEINTZ.
BY
Lippincott & Metcalf
ATTORNEYS.

Patented Sept. 21, 1943

2,330,121

UNITED STATES PATENT OFFICE 2,330,121

MOTOR COOLING SYSTEM

Ralph M. Heintz, Palo Alto, Calif., assignor, by mesne assignments, to Jack & Heintz, Inc., Cleveland, Ohio, a corporation of Ohio Application October 4, 1940, Serial No. 359,712

8 Claims. (Cl. 171—252)

My invention relates to cooling systems and more particularly to a cooling system which is ideally adapted for cooling the interior of heated masses, such as, for example, motor rotors. My invention in one form is also applicable to motor generator stators.

Among the objects of my invention are: To provide a rotating cooling system; to provide a cooling system operating substantially continuously to cool the interior of a rotating member; to provide a system for cooling both the rotor and stator of an electric motor or generator; to provide a system for cooling the rotor of an electric motor or generator; to provide a simple heat-exchanging apparatus; to provide a cooling system for motors or generators operating under heavy loads, and particularly to provide a cooling system for high speed motors or generators which are small in size and deficient in radiating surface in proportion to the power developed thereby.

A further and more specific object of my invention is to provide a novel method of circulating the cooling medium in a cooling system of an electric motor or generator.

A still further object of my invention is to provide a novel and efficient form of circulating fan for circulating air, assisting materially in the rapid cooling of rotating parts.

Other objects of my invention will be apparent or will be specifically pointed out in the description forming a part of this specification, but I do not limit myself to the embodiment of the invention herein described, as various forms may be adopted within the scope of the claims.

In the drawing:

Fig. 1 is a longitudinal sectional view of a preferred form of motor cooling system involving my invention as applied to a diagrammatically represented motor structure.

Fig. 2 is a view, partly in section and partly in elevation, taken as indicated by the line 2—2 in Fig. 1.

Fig. 3 is a view, partly in section and partly in elevation, of a motor rotor using cooling fins at both ends thereof.

Referring particularly to small, low-weight, high-speed motors developed for special uses, such as, for example, starting motors for airplane engines, and motors for operating airplane flaps or landing gears, relatively large amounts of electrical power are dissipated in the motors within a relatively small space and within a relatively short time.

For a given horsepower, torque varies inversely as the speed, and the size of the motors will vary directly as the torque and inversely as the speed. Inasmuch as the efficiency of high and low speed motors is about the same, high speed motors may be so small that their radiating surface becomes insufficient to dissipate the normal heat of operation. The motors therefore, if not provided with a sufficient cooling system, may rise to dangerous temperatures.

My invention permits the dissipation of large amounts of power in very small and compact motors, because I have provided a cooling system which can operate to cool the interior of the rotor of the motor, the stator of the motor, or both, simultaneously.

Broadly, my invention comprises a hollow preferably evacuated member positioned to receive heat from either the rotor or stator of the motor or generator, or both. The interior of this member contains a liquid in a position to be vaporized by the heat received by the member. Upon vaporization, the vapor, at an area apart from the heated portion, is condensed and returned to the heated portion for revaporization either by gravity, or by mechanical means.

More specifically, my invention, as applied to a motor, broadly comprises a hollow shaft upon one portion of which the motor rotor is mounted. The interior of the shaft is provided with the vaporizable liquid, and a portion of the shaft extending beyond the rotor is provided with external cooling fins to condense the vaporized liquid. The cooling fins, during rotation of the shaft draw air inwardly through openings adjacent the shaft and the air is then displaced radially thus insuring good circulation. Since the cool air is drawn over the warmest portion of the shaft, efficiency is greatly increased, and the interior of the shaft may be provided with fins or similar means to return the condensed liquid to that portion of the shaft surrounded by the rotor. The stator of the motor may also be cooled by applying to the exterior thereof hollow members in which a vaporizable liquid is contained, these hollow members extending beyond the stator and terminating in annular fins, registering with the fins on the rotor, so that the air current created by the rotor fins will also pass through these annular fins, thus condensing the stator vapors. In either case, the hollow member is preferably evacuated with the liquid therein, and sealed.

My invention may be more fully understood by direct reference to the drawing.

Fig. 1 illustrates a motor having rotor 1 and a stator 2, rotor 1 being mounted on shaft 3. The representations of the stator and rotor in this figure are purely symbolical, and are intended to represent any type of motor, A. C. or D. C. Shaft 3 is mounted on a motor casing 4, in ballbearings 5. The representation of the casing is also symbolical, as in the case of D. C. motors, a commutator will usually be positioned between the rotor windings and an adjacent bearing 5. Shaft 3 is provided at one end with a shoulder 7 and a tapered exterior surface 8 on which rotor laminations 9 are stacked, these laminations being held thereon by shaft nut 10. For mounting purposes, the laminations may be pre-stacked and the entire stack taper-bored to tightly fit the tapered portion of the shaft. The desired rotor windings 11 may be mounted in the laminations as is usual in the art.

Shaft 3 is provided with an interior space 12, which should preferably also be tapered, this interior space being continued through shaft extension 14 extending outside of rotor 1 on one end thereof. On the exterior surface of the shaft extension 14 are positioned a plurality of fins 15 rotating with the shaft and in good thermal contact therewith, these fins being provided with apertures 16 adjacent the shaft surface. Access may be had with the interior of the shaft through either end thereof as desired, but I have shown in this case the extension 14 sealed by an end cap 17 after a body of vaporizable liquid 18 has been placed therein. This liquid may be water, or other liquids having a relatively high latent heat of vaporization and which are non-corrosive to the shaft material. Interior space 12 may also be provided with longitudinal fins 20 extending along the entire space between cap 17 and the opposite end of the shaft space. Fins 20 are provided with apertures 21 adjacent their contact with the interior surface of shaft 3, so that during rotation liquid may spread over the interior surface of the shaft. I prefer while inserting the liquid 18, to do so while space 12 is under a vacuum and screw cap 17 to the shaft so that the space 12 operates with the liquid therein at less than atmospheric pressure in order to promote vaporization at relatively low temperatures.

Stator laminations 25 are stacked in the usual manner and provided with desired stator windings 26 in accordance with the type of motor, and sectional boilers 27 are applied to the exterior of the stator. The sectional boilers are formed with an interior space 28, this space being evacuated and provided with liquid 18 as is shaft 3. At the end of each section, a hollow tube 30 connects with the interior of each boiler, these hollow tubes extending beyond the stator and carrying a plurality of annular fins 31, these fins preferably being positioned coplanar with fins 15. Thus, both the interior and exterior heat of the motor vaporizes the liquid 18 in the interior of the shaft 3, and the liquid in the various sectional boilers surrounding the stator.

In operation the motor is energized, and as the rotor rotates fins 15 act as a molecular air pump, drawing in air through apertures 16 and discharging this air outwardly between the fins 15; this outwardly discharged air also passes between fins 31. Thus, the rotation of shaft 3 cools both fins 15 and 31. As the liquid 18 in shaft 3 and in the sectional boilers 27 becomes vaporized by the heat of motor operation, the vapor will expand, be condensed by the coldest portions of the chambers, and these portions will be, of course, the portions in contact with fins 15 and fins 31. The vaporization in the heated portion, and the condensation in the cooled portion will create differential pressure and a consequent vapor flow into the cooled portions. In the case of the rotating shaft, the condensed liquid will be directed back into the heated portion of the shaft by centrifugal force acting on the tapered shape of the space. Fins 20, however, are apertured adjacent their contact with the interior surface of the shaft, thus allowing the liquid, due to centrifugal force, to distribute itself as a film over the interior surface of the shaft. It will there be again vaporized by the heat passing through the shaft from the rotor.

Thus there is a continuous flow of vapor to the cooled portions and a continuous return flow of liquid. Likewise, in the sectional boilers 27 the liquid in each one of them will be vaporized, the vapor flowing to tubes 30, condensing in said tubes and returning by gravity to the interior of the boilers.

In many cases, I have found that it is only necessary for the interior of the rotor to be cooled by my invention, as stators may be cooled by external fins applied directly to the stator structure, or by other cooling means, such as a direct liquid flow. I wish it to be distinctly understood, therefore, that in many cases, the boiler type of cooling structure may be dispensed with on the stator.

In Fig. 3 I have shown a slight modification of rotor construction where the shaft is provided with a double taper, and the rotor laminations can be applied from both ends. Both ends of this type of shaft are provided with fins 15 and both ends are cooled by shaft rotation. In this case, the liquid is vaporized in the central portion of the shaft and is condensed at both ends and returned therefrom to the center of the shaft.

The rotating cooling system above described will operate in any position. When a tapered space is used in the shaft and the motor operated with the fins down, centrifugal force will tend to distribute the liquid upwardly in the shaft space. If the motor is operated with the cooling fins up, gravity will return the liquid to the bottom of the space aided by centrifugal force, while centrifugal force also keeps the liquid in contact with the interior shaft surface. Thus in motors to be used with the fins up, no tapering of space 12 may be necessary. In any case the main desideration is that the liquid shall be properly and fairly uniformly distributed over the shaft material to be vaporized by the heat thereof and thereby remove heat therefrom.

I wish it to be understood that while I have described my invention as a heat exchanging system and method of circulating a cooling medium by centrifugal force applied to an electric motor, the system and method as described and claimed herein may be applied with particular efficiency to any rotating structures receiving heat along one portion thereof, with transfer to, and dissipation of such heat in, a portion of the structure apart from the heated portion.

I claim:

1. A motor comprising a shaft having a conical axial bore therein, a motor rotor mounted on said shaft and surrounding the larger end portion of said bore, a plurality of parallel circular cooling fins mounted on said shaft adjacent the smaller end portion of said bore, means for sealing said bore, and a liquid vaporizable by the running heat of said rotor within said bore.

2. Apparatus in accordance with claim 12 wherein a motor stator is provided surrounding said rotor, and wherein a sealed container having a liquid therein vaporizable by the operating heat of said stator is positioned in contact with said stator, said container having a portion extending beyond said stator and being provided with annular fins coplanar with the cooling fins on said shaft.

3. Apparatus in accordance with claim 12 wherein a motor stator is provided surrounding said rotor, and wherein a sealed container having a liquid therein vaporizable by the operating heat of said stator is positioned in contact with said stator, said container having a portion extending beyond said stator and being provided with annular fins coplanar with the cooling fins on said shaft, and wherein air intake apertures are provided in said cooling fins adjacent said shaft, air entering through said apertures being discharged between said cooling fins and thereafter between said annular fins.

4. A heat exchanger comprising a sealed hollow shaft mounted for rotation, the hollow portion of said shaft comprising a tapered axial bore a source of heat in contact with one portion of said shaft, cooling means in contact with another portion of said shaft, a liquid within said hollow shaft vaporizable by the applied heat and condensible by said cooling means, said cooling means being in the form of circular fins attached to the exterior of said shaft and rotating therewith and having apertures therein adjacent said shaft.

5. A heat exchanger comprising a sealed hollow shaft mounted for rotation, a source of heat in contact with one portion of said shaft, cooling means in contact with another portion of said shaft, a liquid within said hollow shaft vaporizable by the applied heat and condensible by said cooling means, the interior of said shaft being shaped to return the condensate to the heated portion of said shaft by centrifugal force when said shaft is rotated.

6. A rotating shaft having a conical axial bore therein, a source of heat mounted on said shaft surrounding the larger end portion of said bore, and a plurality of cooling fins mounted on said shaft adjacent the smaller end portion of said bore, said cooling fins having apertures adjacent said shaft, air entering said apertures being discharged between said cooling fins, and a liquid vaporizable by the source of heat, sealed in said bore.

7. A rotating shaft having a conical axial bore therein, a liquid vaporizable by a source of heat adjacent the larger end of said bore sealed in said bore, and a plurality of circular cooling fins mounted parallel to each other on said shaft, adjacent the smaller end of said bore, said cooling fins having apertures adjacent said shaft, air entering said apertures being discharged between said cooling fins.

8. A heat exchanger comprising an elongated hollow member subjected to heat adjacent one end thereof, means for rotating said hollow member on its longitudinal axis, means for sealing the interior of said hollow member with a liquid therein vaporizable by said heat, a plurality of cooling fins on said shaft remote from the heated end thereof, and means for distributing said liquid over the interior surface of said hollow member during rotation thereof, said distributing means comprising longitudinal fins along the interior surface of said shaft, said fins extending inwardly and being provided with a plurality of openings between the basal portion of said fins and said interior surface to provide peripheral paths for said liquid to spread over said surface.

RALPH M. HEINTZ.

Certificate of Correction

Patent No. 2,330,121.　　　　　　　　　　　　　　　　　　September 21, 1943.

RALPH M. HEINTZ

It is hereby certified that error appears in the printed specification of the above numbered patent requiring correction as follows: Page 3, first column, lines 3 and 12, for the claim reference numeral "12" read *1*; and that the said Letters Patent should be read with this correction therein that the same may conform to the record of the case in the Patent Office.

Signed and sealed this 15th day of October, A. D. 1946.

[SEAL]

LESLIE FRAZER,
*First Assistant Commissioner of Patents.*